United States Patent [19]

Onmori et al.

[11] Patent Number: 4,783,022
[45] Date of Patent: Nov. 8, 1988

[54] MAGNETIC TAPE CASSETTE WITH A TAPE-END DETECTING PRISM

[75] Inventors: Shozo Onmori; Shingo Katagiri, both of Kanagawa, Japan

[73] Assignee: Fuji Photo Film Co., Ltd., Kanagawa, Japan

[21] Appl. No.: 65,754

[22] Filed: Jun. 24, 1987

[30] Foreign Application Priority Data

Jun. 24, 1986 [JP] Japan .............................. 61-95323[U]

[51] Int. Cl.⁴ ........................ G11B 15/32; G11B 23/08
[52] U.S. Cl. ..................................... 242/199; 360/132
[58] Field of Search ............................... 242/197–200; 360/132

[56] References Cited

U.S. PATENT DOCUMENTS 4,022,395  5/1977  Kishi .................................. 242/198

Primary Examiner—David Werner
Attorney, Agent, or Firm—Sughrue, Mion, Zinn, Macpeak, and Seas

[57] ABSTRACT

A magnetic tape cassette in which the hubs are locked when the front panel is closed and having an optical prism adjacent the tape path between a tape guide member and a hub. A projection is provided between the prism and the hub so that the tape is tensioned between the tape guide member and the projection and never contacts the prism, even during cassette assembly.

7 Claims, 1 Drawing Sheet

MAGNETIC TAPE CASSETTE WITH A TAPE-END DETECTING PRISM

BACKGROUND OF THE INVENTION

1. Field of the Invention

The present invention relates to a magnetic tape cassette, and particularly relates to an original compact magentic tape cassette whose size is not larger than a magnetic tape cassette of the Philips type and which is used for an audio equipment or the like.

2. Background of the Invention

In recent years, the size and weight of a cassette tape recorder have been reduced. A compact magnetic tape cassette has become widely used for the cassette tape recorder of reduced size and weight. In the field of audio equipment, a magnetic tape cassette has become strongly desired which is usable for recording and reproduction of high quality and density for a long time. A type of magnetic tape cassette which meets this desire is widely known as a magnetic tape cassette of the digital type such as the pulse code modulation (PCM), in which an input signal is converted into pulses for recording and reproduction in an operation different from the analog type.

Nowadays, a large video tape cassette has become generally used as a magnetic tape cassette of the digital type. In this large video tape cassette, the recorded frequency band is made wider than that for a conventional audio tape cassette because the recorded frequency band for the large video tape cassette needs to be made about five times wider than that for the conventional audio tape cassette. The large video tape cassette is recorded and played with a rotary-head system (except for special cases) and has such a construction that an opening provided in the front of the cassette may be closed with a guard panel which is openable upwardly from the cassette. Since the large video tape cassette is of the digital type, recording and reproduction of high density and wide frequency band are performed with a shorter recorded wavelength for the cassette than for a conventional compact audio tape cassette. For that reason, the video tape cassette requires a design in which dust-proofing and tape protection measures are taken.

The magnetic tape cassette, to which the present invention relates and which meets the above-mentioned desire, can be used for an audio equipment of the like for which a recording/reproduction system of relatively wide frequency band is adopted and can be used as well as the above-described video tape cassette. The size of the magnetic tape cassette is no larger than that of the conventional compact audio tape cassette and is therefore very small. For that reason, the magnetic tape cassette is expected to be carried and used outdoors as frequently as the conventional compact audio tape cassette. Consequently, the magnetic tape cassette has been required to have such construction that a high dustproof protection is achieved with a dustproof mechanism that does not improperly operate, and tape jamming or the like is reliably prevented from occurring due to tape looseness caused by the vibration of the cassette during its carrying or the like.

One of magnetic tape cassettes proposed to meet the above-mentioned requirement is provided with a locking member so that hubs on which a magnetic tape is wound are locked or unlocked by the locking member when the tape is put in use or out of use. The locking member is always urged toward the hubs by a spring so that sharp-pointed projections provided on the locking member come into contact with the hubs to hinder their rotation when the tape is not in use. The projections are separated from the hubs when the tape is in use. The locking member has arms extending in opposition to the sharp-pointed projections. Claws are provided on the tip portions of the arms so that the claws extend rightward and leftward. When a guard panel is turned in such a direction as to open the front of the cassette, locking portions protrusively provided on the inner surfaces of both side walls of the guard panel slide the locking member in the forward direction of the cassette while engaging with the claws, to disengage the sharp-pointed projections from the hubs. When the hubs are unlocked, the arms of the locking member slide on a lower half casing and a flat portion having the sharp-pointed projections moves near the inside surfce of an upper half casing. For that purpose, each of the arms and the flat portion are located at a distance from each other nearly equal to the depth of the interior of the cassette. The spring acts on the flat portion to urge the locking member in such a direction as to lock the hubs.

To assemble the magnetic tape cassette, some members are sequentially set in the lower half casing. Since the spring for urging the locking member acts between the upper half casing and the locking member, the assembly is performed as the locking member remains urged by the spring and fitted to the upper half casing. However, if the lower half casing, in which the hubs with the magnetic tape would thereon are set and the upper half casing, fitted with the locking member, were assembled with each other as they were, the sharp-pointed projections would be over-laid on the hubs because the locking member is urged to such a position as to lock the hubs. For that reason, the guard panel is fitted to the upper half casing. Then, the panel is turned so that the locking member is pulled out to such a position as to unlock the hubs. The upper half casing is thereafter assembled with the lower half casing.

A prism receives light from a tape-detecting light emission element in a recording/reproduction machine, refracts the light and reflects it to a light reception element. The prism is located in the upper half casing so that the prism is located in a more internal position than a predetermined magnetic tape movement path. As a result, the magnetic tape does not come into contact with the prism when the tape is moved for recording and reproduction.

At the time of the above-described assembly, the magnetic tape is wound on one of the two hubs and tightly supported on a pair of tape guide members provided in the lower half casing at both the sides of the front opening thereof. A leader tape secured to the hub on which the magnetic tape is not wound is tightly supported between the hub and the tape guide member in a more internal position (line A of FIG. 1) than the predetermined magnetic tape movement path. When the upper half casing is assembled with the lower half casing, it is likely that the leader tape will contact the prism provided in the upper half casing and be guided along the oblique reflecting surface of the prism and forced to a more internal position (line C) than the prism thereby making it possible to locate the magnetic tape and smoothly move it to it's correction position. This has become a significant problem in cassette assembly.

Such a problem also occurs in the so-called C-O winding method in which hubs are assembled to construct magnetic tape cassette and a magnetic tape is thereafter wound on the hubs.

SUMMARY OF THE INVENTION

The present invention was made in order to solve the above-described problem.

Accordingly it is an object of the present invention to provide a magnetic tape cassette of such construction that the cassette can be assembled while a leader tape remains located in a more external position than a prism and that the dependable movement of a magnetic tape is secured after the assembly is performed.

In the magnetic tape cassette of the invention, a locking member for locking a pair of hubs on which the magnetic tape is wound is provided in an internal space defined by an upper and a lower half casings. The locking member is pulled out in the forward direction of the cassette as a guard panel covering an opening is turned, to unlock the hubs. This structure makes it possible to pull out the magnetic tape in the forward direction of the cassette.

The magnetic tape cassette is characterized in that projections for tightly supporting the magnetic tape are provided in the front portion of the lower half casing behind a pair of tape guide members tightly supporting the tape so that the projections are located in more internal positions than a predetermined tape movement area. A tape detection prism is located between the tape guide member and therefore, the projection and the magnetic tape does not come into contact with the prism.

When one of the hubs is set in the lower half casing in assembling the magnetic tape cassette, the leader tape is tightly supported on the hub, the projection and the tape guide member to define a space into which the prism in the upper half casing is to be inserted. As a result, the prism does not come into contact with the leader tape but is located in a more internal position than the leader tape at the time of the assembly of the upper and the lower half casings. For that reason, the leader tape and the magnetic tape can be moved in a proper movement path (line A) by the rotation of the hubs.

The projection limits the space for the tight supporting of the leader tape secured to the hub set in the lower half casing in assembling the magnetic tape cassette. Since the projection is provided in the lower half casing so that the space into which the prism provided in the upper half casing is to be inserted is defined in a more internal position than the leader tape tightly supported on the hub and the tape guide member located in the front portion of the lower half casing, the leader tape and the prism do not come into contact with each other at the time of the assembly of the upper and the lower half casings. For that reason, the leader tape does not move a more internal position than the prism at the time of the assembly so that the leader tape can be moved in a proper position. Since the projection restricts the position of the leader tape between the inserted position of the prism and the movement path for the tape, the leader tape goes off the projection at the beginning of the rotation of the hub and is then moved in a tangential direction on the hub so that the projection does not adversely effect the movement of the magnetic tape.

For these reasons, the magnetic tape cassette is ensured to have an appropriate assembling property and a good tape moving property.

DETAILED DESCRIPTION OF EXEMPLARY EMBODIMENT

An embodiment of the present invention is hereafter described with reference to FIGS. 1 and 2 attached hereto.

Figure 1:
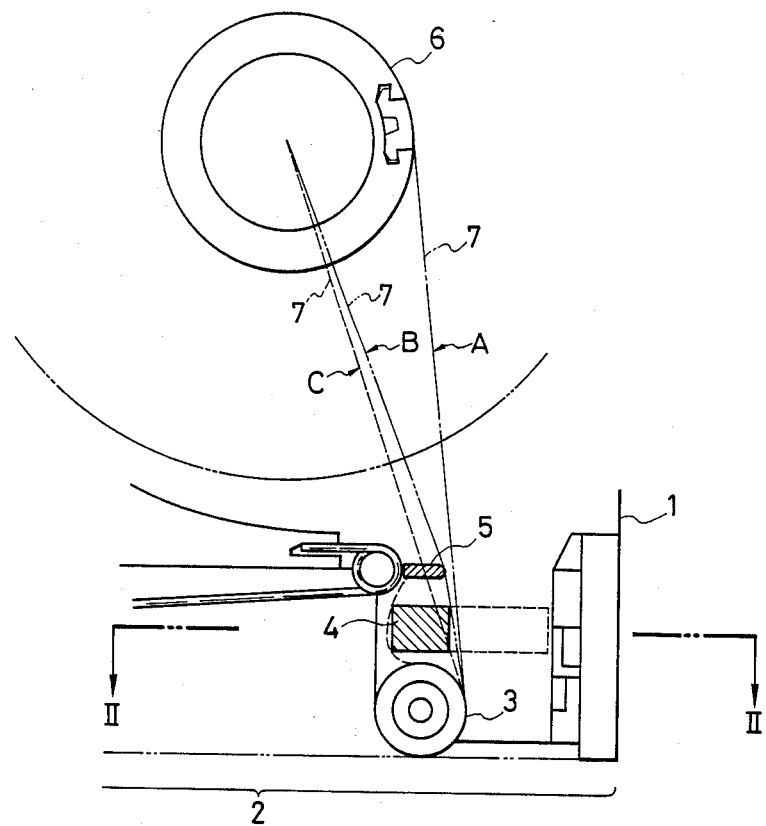
FIG. 1 shows a partial plan view of a lower half casing.
Figure 2:
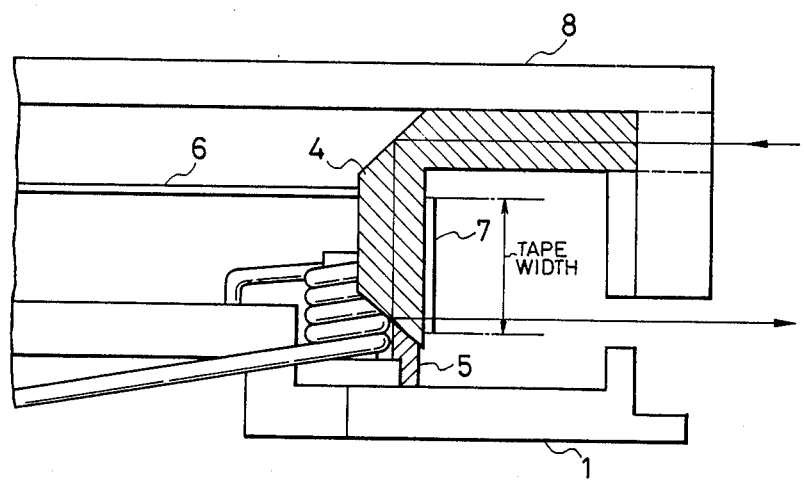
FIG. 2 shows an enlarged sectional view taken along the line II—II in FIG. 1.

FIG. 1 shows a partial plan view of the embodiment which is a magnetic tape cassette in the state that a hub is set in a lower half casing 1. A pair of tape guide members 3 for restricting a magnetic tape are provided at both the sides of the front opening of the lower half casing 1. Only one of the sides is shown in FIG. 1. A prism 4, which is provided in an upper half casing, is placed in a more internal position than the tape guide member 3. A projection 5 is provided in the lower half casing 1 so that the projection is located behind the prism 4.

When the magnetic tape cassette is assembled, a magnetic tape is wound on one of two hubs and the hubs are then set on a friction sheet in the lower half casing 1. At that time, the magnetic tape is not wound on the other hub 6 shown in FIG. 1. However, a leader tape 7 continuous with the magnetic tape is secured to the hub 6. When the hub 6 is set in the lower half casing 1, the magnetic tape and the leader tape 7 are in a tensioned state and the hub 6 on which the magnetic tape is not wound is pulled in the radial direction of the hub 6 by the leader tape 7. At that time, the leader tape 7 is tightly supported on the hub 6, the projection 5 and the tape guide member 3.

The projection 5 limits the position of the leader tape 7 between the hub 6 and the tape guide member 3 so that it can not enter the space in which the prism 4 is to be placed when the upper half casing and the lower half casing 1 are assembled. The projection 5 assures that the route of the leader tape 7 between the hub 6 and the tape guide member 3 is surely defined in a more external position than the prism 4 and in a more internal position than the common tangent A to the hub 6 and the tape guide member 3, that is, on a median line B in FIG. 1, on which a predetermined magnetic tape movement path is located. For that reason, the leader tape 7 does not come into contact with the prism 4, and is tightly supported in a tangential direction A on the hub 6 at the beginning of the rotation of the hub 6 in the use of the magnetic tape. In other words, as the hub rotates from the minimum tape position the leader tape will move off the projection 5 so that as it move to the tangential position the magnetic tape following the leader tape 7 does not contact the projection 5.

It is preferable that the height of the projection 5 from the bottom of the lower half casing 1 is such that the projection supports the leader tape 7 along the total width thereof. However, the height may be such that the projection 5 supports the leader tape 7 along only a part of its width. Even in the latter case, the space in which the prism 4 is placed is secured.

Only one projection 5 is enough if it is provide in the above-described position corresponding to the winding hub 6. However, a pair of projections may be provided in the right and left portions of the magnetic tape cassette so that one of the hubs can be optionally used as the winding boss assembling the magnetic tape cassette.

What is claimed is:

1. A magnetic tape cassette, comprising:
    a cassette case;
    a pair of hubs rotatably disposed in said cassette case for winding a tape;
    a pair of tape guide members located adjacent a front wall of said cassette case for tightly supporting said tape being would on respective ones of said hubs;
    an optical prism located between one of said tape guide members and one of said hubs for detecting an end of said tape; and
    a projection disposed between said tape guide member and said one hub for supporting said tape and for preventing said tape from contacting said optical prism when said tape is wound on said hub from a minimum length to a maximum length of said tape;
    wherein said projection is dimensioned such that said tape cannot contact said projection when said tape is tangent to said hub.

2. A magnetic tape cassette as recited in claim 1, wherein said cassette case comprises a first half casing supporting said hubs, said tape guide members and said projection and a second half casing supporting said prism and engageable with said first half casing.

3. A magnetic tape cassette as recited in claim 1, comprising two of said projections disposed between respective ones of said hubs and said tape guide member.

4. A magnetic tape cassette as recited in claim 3, further comprising:
    a locking member slidable in a front and a rear direction of said cassette case for engaging and locking said two hubs; and
    a guard panel covering an opening in said front wall of said cassette case and couple with said locking member.

5. A magnetic tape cassette as recited in claim 1, wherein said projection is between said optical prism and said hub.

6. A magnetic tape cassette as recited in claim 1, wherein said projection is dimensioned such that said tape contacts said projection only when said tape is at a minimum length on said hub.

7. A magnetic tape cassette as recited in claim 1, wherein said projection is dimensioned such that said tape cannot contact said projection when said tape is other than at a minimum length on said hub.

* * * * *